United States Patent
Mosko

(10) Patent No.: US 10,942,686 B2
(45) Date of Patent: Mar. 9, 2021

(54) PRINTER RECOMMENDATION SYSTEM

(71) Applicant: Palo Alto Research Center Incorporated, Palo Alto, CA (US)

(72) Inventor: Marc E. Mosko, Santa Cruz, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 16/195,397

(22) Filed: Nov. 19, 2018

(65) Prior Publication Data

US 2020/0159466 A1 May 21, 2020

(51) Int. Cl.
  *G06F 3/12* (2006.01)
  *G06K 15/02* (2006.01)

(52) U.S. Cl.
  CPC ............ *G06F 3/1204* (2013.01); *G06F 3/126* (2013.01); *G06F 3/1231* (2013.01); *G06F 3/1253* (2013.01); *G06F 3/1288* (2013.01)

(58) Field of Classification Search
  None
  See application file for complete search history.

(56) References Cited

U.S. PATENT DOCUMENTS

| | | | | | |
|---|---|---|---|---|---|
| 6,724,494 | B1* | 4/2004 | Danknick | ............... | G06F 3/121 358/1.14 |
| 7,042,585 | B1* | 5/2006 | Whitmarsh | ........... | G06F 3/1205 358/1.13 |
| 8,854,669 | B1* | 10/2014 | Jazayeri | ................ | G06F 3/1204 358/1.15 |
| 9,665,327 | B1* | 5/2017 | Yokoohji | ................. | G06F 3/126 |
| 9,772,807 | B1* | 9/2017 | Osadchyy | ........... | H04L 41/0853 |
| 2002/0027673 | A1* | 3/2002 | Roosen | .............. | H04N 1/00204 358/1.13 |
| 2005/0019077 | A1* | 1/2005 | Hatta | .................. | H04N 1/00132 400/62 |
| 2011/0310428 | A1 | 12/2011 | Ciriza et al. | | |
| 2012/0065802 | A1* | 3/2012 | Seeber | .................. | G06F 1/3203 700/295 |
| 2012/0293828 | A1* | 11/2012 | Burke, Jr. | .............. | G06Q 30/04 358/1.15 |
| 2013/0163014 | A1* | 6/2013 | Xiao | ..................... | G06F 3/1288 358/1.13 |
| 2014/0118790 | A1* | 5/2014 | Huster | .................. | G06F 3/1207 358/1.15 |
| 2015/0077800 | A1* | 3/2015 | Yamagishi | ............ | G06F 3/1204 358/1.15 |

(Continued)

*Primary Examiner* — Beniyam Menberu
(74) *Attorney, Agent, or Firm* — Shun Yao; Park, Vaughan, Fleming & Dowler LLP

(57) ABSTRACT

Embodiments described herein provide a system for facilitating a printer recommendation in an enterprise environment. During operation, the system receives, from a user device in the enterprise environment, a print task for a file. The system then determines a list of printers accessible from the enterprise environment based on metadata associated with the file from a printer database. The printer database stores information associated with a respective printer accessible from the enterprise environment. A respective printer in the list of printers can be available and feasible for the print task. The system then ranks the list of printers with respect to an objective of the print task and presents the ranked list as a printer recommendation for the print task in a user interface to the user.

20 Claims, 11 Drawing Sheets

(56) References Cited

U.S. PATENT DOCUMENTS

| | | | |
|---|---|---|---|
| 2015/0199157 A1* | 7/2015 | Xiao | G06F 3/1236 |
| | | | 358/1.15 |
| 2015/0242176 A1* | 8/2015 | Naik | H04L 67/16 |
| | | | 358/1.15 |
| 2018/0150041 A1* | 5/2018 | Ohishi | G05B 15/02 |

* cited by examiner

PRINTER RECOMMENDATION SYSTEM

BACKGROUND

Field

This disclosure is generally related to the field of process management. More specifically, this disclosure is related to a system and method for recommending a printer for a specific printing task based on available printers.

Related Art

The proliferation of the Internet and e-commerce continues to create a vast amount of digital content. An enterprise or large corporation may include a network of managed devices distributed across multiple sites. In such a network of devices, a device manager may manage (e.g., configure and control) the devices in a local network of one of the sites. This device manager can be responsible for firmware updates, policy file distribution, or data transfers. For example, if the device manager is a printer manager, the devices can be printers, and the printer manager can be responsible for managing the printers.

A conventional printer manager typically manages printers based on, e.g., a Simple Network Management Protocol (SNMP) query, which is based on the Internet Protocol (IP) addresses of the printers. However, each printer can be assigned an IP address by a Dynamic Host Configuration Protocol (DHCP) server based on a local address pool (e.g., from a set of private IP addresses). To facilitate access to the printers in a private network, the printer manager conventionally resides within the same network, such as the same private IP sub-network and the local area network (LAN).

However, the printer manager's responsibility is typically limited to management. The printer manager may not provide assistance to a user printing a file. The user can install device-dependent or manufacturer-dependent printer drivers to access the service of a printer. As a result, if the enterprise environment includes a large number of printers with varying capabilities, the user needs to determine which printer is suitable for the printing task. Since the user may not be aware of the capabilities of the printers and the surrounding resources, the user may not choose a suitable printer for a particular printing task.

Hence, even though a printer manager brings many desirable features to printer management, some issues remain unsolved in matching printers to print tasks based on the requirements of the tasks.

SUMMARY

Embodiments described herein provide a system for facilitating a printer recommendation in an enterprise environment. During operation, the system receives, from a user device in the enterprise environment, a print task for a file. The system then determines a list of printers accessible from the enterprise environment based on metadata associated with the file from a printer database. The printer database stores information associated with a respective printer accessible from the enterprise environment. A respective printer in the list of printers can be available and feasible for the print task. The system then ranks the list of printers with respect to an objective of the print task and presents the ranked list as a printer recommendation for the print task in a user interface to the user.

In a variation on this embodiment, the system obtains a user input from the user interface. If the system detects a change in the printer recommendation, the system can update the ranked list based on the user input to regenerate the printer recommendation and present the regenerated printer recommendation in the user interface.

In a further variation, the system receives a selection of a target printer from the printer recommendation via the user interface and sends the print task to the target printer.

In a variation on this embodiment, the system discovers a printer accessible from the enterprise environment based on a discovery mechanism. The discovery mechanism can be one or more of: a centralized mechanism, a decentralized mechanism, and a cloud-based mechanism.

In a further variation, the system stores a printer profile for the discovered printer in the printer database. The printer profile includes one or more of: a printer name, a printer identifier, a printer location, intrinsic capabilities of the discovered printer, extrinsic capabilities of the discovered printer, and cost information.

In a further variation, the system discovers print-related resources within a predetermined proximity of the discovered printer and stores the print-related resources in the printer profile.

In a further variation, the system obtains a policy associated with the discovered printer and stores the policy in the printer profile.

In a variation on this embodiment, the system identifies an external print service provider based on cloud-based information or a plug-in and determines a printer profile of a printer of the external service provider. The system then stores the printer profile in the printer database.

In a variation on this embodiment, the objective can be one or more of: quickest to complete, cheapest to use, nearest location, and most secure.

In a variation on this embodiment, the system determines whether a printer is available and feasible based on permanent issues and temporary issues.

BRIEF DESCRIPTION OF THE FIGURES

In the figures, like reference numerals refer to the same figure elements.

DETAILED DESCRIPTION

Figure 1A:
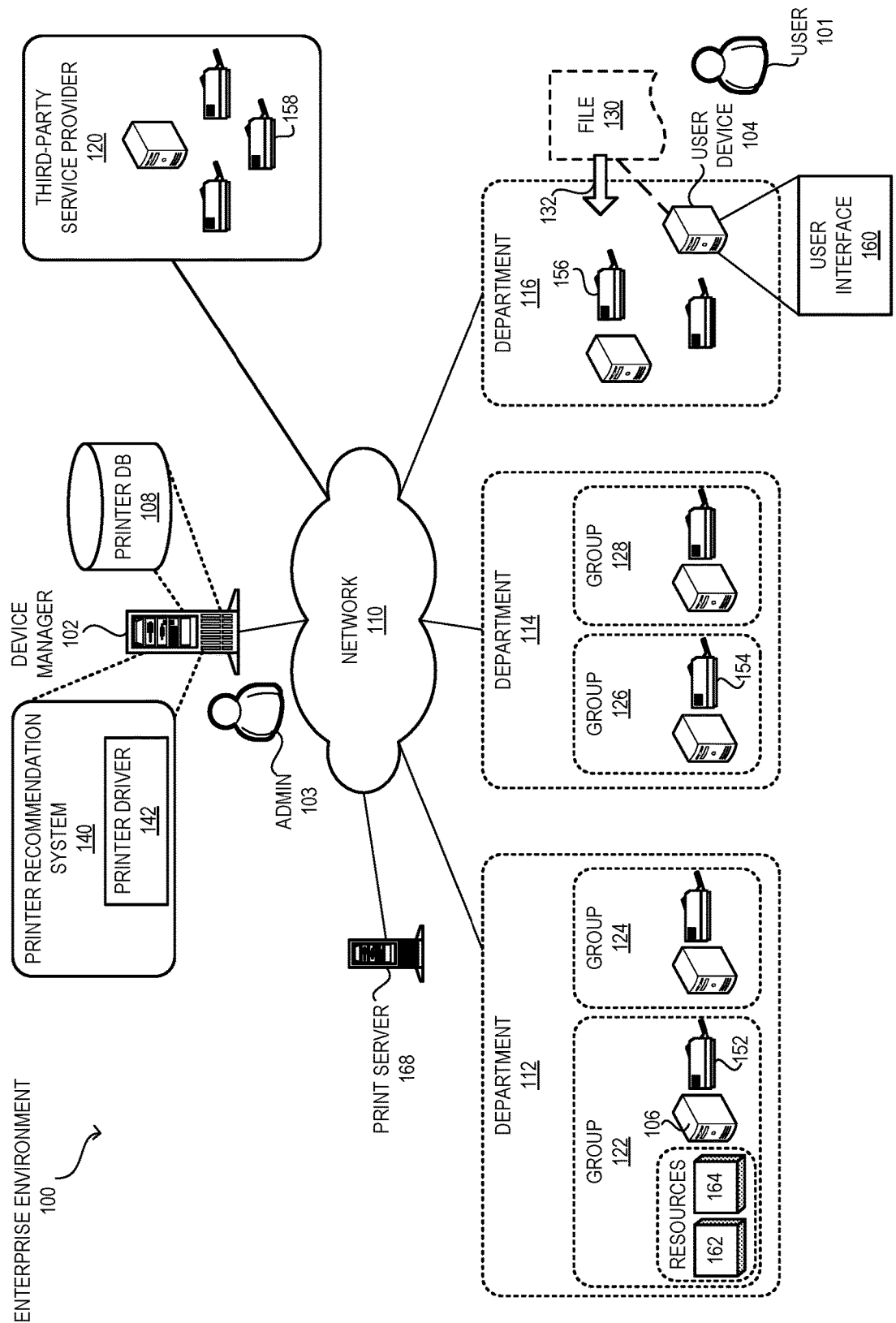
FIG. 1A illustrates an exemplary printer recommendation system with centralized control in an enterprise environment, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently matching printers to print tasks by determining the requirement of a particular print task based on metadata analysis and user inputs, and providing a recommended list of printers suitable for performing the print task. This allows the user to select a printer that can perform the print task efficiently.

With existing technologies, an administrator in an enterprise environment can install device-dependent or manufacturer-dependent printer drivers on a respective computer that may access the service of a specific printer or a specific class of printers. Some operating systems can automate the process by installing the printer drivers an as-needed basis. For example, the operating system of a user device can install the printer driver when the user device initiates a print task through a network print server. Some solution providers may offer generic printer drivers that can be used for multiple manufacturers. However, even using such a driver, a user still needs to print to a specific printer. In addition, if a print task is sent outside of an enterprise environment, such as to a cloud-based printing service or a third-party printing service, a user may not retain control over how that print task is executed.

To solve this problem, embodiments described herein provide a printer recommendation system that integrates all available printing resources and guides a user in selecting a printer device based on the features of the print task. The system can provide a user interface that presents a printer recommendation listing one or more printers suitable for the print task. The system allows the enterprise environment to support rare features (e.g., large page support or binding finish) on a small number of printers and directs the users needing those features toward these printers. In this way, from a set of feasible printers, the system can guide the user to select a printer that may achieve an objective (e.g., the quickest to complete, cheapest to use, nearest location, most secure, etc.).

In some embodiments, the system can facilitate a single printer driver that can be aware of all available print resources and can guide the user to a suitable printer or an external service for a set of task features. Examples of task features include, but are not limited to, duplex printing, color, color matching, paper size, paper quality, finisher options (e.g., stapling or binding), security features (e.g., encrypted printing, encrypted hard drives, and authentication features, such as a badge or a personal identification number (PIN)). An administrator can also enable external services, such as a print shop (e.g., FedEx Office), based on web access or plug-ins. The printer driver, when installed, can limit a user's access to the available printers and/or external print services based on the privilege of the user and enterprise policies.

The administrator can define a set of policies to the system. For example, a policy can indicate the cost associated with a respective service that a respective printer provides. The costs can also be pre-calculated based on averages provided by an online service or installed with the driver. In this way, the system can support configurable printing costs. The system can also use document-specific restrictions to determine the recommendation. For example, a document may require in-person document release, print on specific sets of printers, or exclude external services. In some embodiments, the system can recommend a printer such that the features of the recommended printer are not over-provisioned. For example, if a document does not include color, the system can avoid color printers and only recommend monochrome (e.g., black-and-white) printers.

The system can be implemented on a centralized controller (e.g., a device manager) that manages a respective printer in the enterprise environment. The system can be centrally configured in the enterprise environment. The system can also operate without a centralized control. Such a deployment can be suitable for small and medium businesses, and uses decentralized mechanisms to learn the printing environment and can self-configure. The system can also be deployed as a cloud-based print service. The printer driver on a respective device then accesses the cloud-based service by logging in to the cloud-based system and learns the configurations.

Exemplary System

FIG. 1A illustrates an exemplary printer recommendation system with centralized control in an enterprise environment, in accordance with an embodiment of the present application. An enterprise environment 100 can include a number of departments 112, 114, and 116. The devices in enterprise environment 100 can be coupled to each other via a network 110, such as a local or a wide area network. The wide area network can be the Internet. Each department can maintain a local area network and an Internet Protocol (IP) subnet, and may have direct connection with other departments (e.g., with point-to-point optical fiber). Department 112 can include multiple groups 122 and 124, and department 114 can include multiple groups 126 and 128. Each group can include user devices (e.g., workstations) and printing devices (e.g., local or network printers). For example, group 122 can include user device 106 and printer 152. Furthermore, some groups can facilitate additional resources. In this example, group 122 can facilitate additional resources 162 and 164. Examples of additional resources include, but are not limited to, a photocopier, a binder machine, a paper cutter, and a stationery supply closet.

With existing technologies, an administrator 103 in enterprise environment 100 can install device-dependent or manufacturer-dependent printer drivers on a respective device that may access a printer or a specific class of printers. Some operating systems can automate the process by installing the printer drivers on an as-needed basis. Suppose that user 101 initiates a print task 132 for file 130 from user device 104. The operating system of user device 104 can install the printer driver when device 104 initiates print task 130 through a print server, which can run on a device manager 102 or on a separate network print server 168. Device manager 102 can be responsible for managing (e.g., configuring and controlling) the devices in network environment 100. The driver installed by the operating system of device 104 can be a generic printer driver that can be used for multiple manufacturers. However, even using such a driver, user 101 still needs to print to a specific printer supported by that driver. In addition, if print task 132 is sent outside of enterprise environment 100, such as to a cloud-based printing service or a third-party service provider 120, user 101 may not retain control over how that print task is executed.

To solve this problem, enterprise environment 100 can include a printer recommendation system 140 that integrates all available printing resources in enterprise environment 100 and guides user 101 in selecting a printer device based on the metadata of file 130 (e.g., monochrome document or a color image, security features, etc.) and the features of print task 132 (e.g., double-sided and/or stapled). System 140 can provide a user interface 160 that presents a printer recommendation listing one or more printers suitable for the print task. Interface 160 can be based on a graphical user interface (GUI), a web interface, a text-based interface, and a projection-based interface (e.g., a hologram interface). System 140 allows enterprise environment 100 to support rare features (e.g., large page support or binding finish) on a small number of printers (e.g., printer 152). System 140 can guide user 101 to direct print task 132 toward printer 152 if print task 132 needs these features. Otherwise, system 140 can guide user 101 to direct print task 132 to another printer 156, which can be closer to device 104.

In this way, from a set of feasible printers, system 140 can guide user 101 to select a printer that may achieve an objective (e.g., the quickest to complete, cheapest to use, nearest location, most secure, etc.) associated with print task 132. For example, if the objective is to print to a nearest location, system 140 can indicate in interface 160 that printer 156 is the nearest printer to device 104. However, printer 156 may be occupied with another print task and may not be the quickest to complete. Interface 160 can indicate that if user 101 selects printer 154, print task 132 can be completed at the earliest time. Based on these recommendations, user 101 can select a printer from interface 160.

In some embodiments, system 140 can facilitate a single printer driver 142 that can be aware of all available print resources and can guide user 101 to a suitable printer or an external service for a set of task features associated with print task 132. Examples of task features include, but are not limited to, duplex printing, color, color matching, paper size, paper quality, finisher options (e.g., stapling or binding), security features (e.g., encrypted printing, encrypted hard drives, and authentication features, such as a badge or a personal identification number (PIN)). Driver 142 can be installed on a respective device, such as devices 104 and 106, to allow the corresponding user to access the printing resources of enterprise environment 100.

Administrator 103 can also enable external services, such as a print shop (e.g., FedEx Office), based on web access or plug-ins. For example, service provider 120 can allow system 140 to gain access to its printers, such as printer 158. As a result, if print task 132 is suitable for service provider 120 (e.g., a large number of booklet prints), interface 160 can recommend printer 158 for print task 132. Printer driver 142, when installed on device 104, can limit user 101's access to the available printers and/or service provider 120 based on the privilege of user 101 and enterprise policies. For example, user 101 may only be able to access printers 152 and 154, but not printers 156 and 158. In addition, administrator 103 can define a set of policies to system 140. A policy can indicate the cost associated with a respective service that a respective printer provides. These costs can also be pre-calculated based on averages provided by an online service or can be specified in driver 142.

In this way, system 140 can support configurable printing costs. System 140 can also use document-specific restrictions to determine the recommendation. For example, file 130 may require an in-person document release (e.g., user 101 needs to be present at the printer), print on specific sets of printers (e.g., only on printers 152 and 154), or exclude external services (e.g., service provider 120). In some embodiments, system 140 can recommend a printer such that the features of the recommended printer are not over-provisioned. If file 130 does not include color, system 140 can avoid color printers and only recommend monochrome printers.

When driver 142 learns of printer 152, driver 142 can communicate with printer 152 to learn features of printer 152. Driver 142 can use Internet Printing Protocol (IPP) or Simple Network Management Protocol (SNMP) to query printer 152. Driver 142 may use make-/model-specific mechanisms to learn about non-standardized features. If a third-party printer driver is available for printer 152, system 140 can analyze that driver to learn about the proprietary features of printer 152. System 140 then creates a profile for printer 152 that includes the features. If administrator 103 has provided a cost-related policy for printer 152, the profile can also include costs associated with each feature. System 140 may store the profile in an entry of printer database 108.

In some embodiments, system 140 can obtain proximity information for printer 152 and determine how close printer 152 is to device 104. System 140 may obtain the proximity information from location information of device 104 (e.g., from user 101 or a configuration file indicating device 104's location) or a policy defined by administrator 103. This allows system 140 to offer features and printers based on proximity in addition to other objectives, such as cost or speed. User 101 may select from a set of default print job features, such as paper size, duplex printing, color/monochrome printing, paper quality, etc. System 140 can also determine default settings from location. For example, system 140 can set "letter" as the default paper size in the U.S. and A4 as the default paper size in Asia.

In some embodiments, system 140 can support third-party web services and plug-ins. Third-party service provider 120 can create printer profiles with available features and cost information. These printer profiles can also include a mechanism to determine the current task schedule and load on a printer, such as printer 158, of provider 120. Provider 120 can also supply provider information, such as location and delivery information (e.g., the location of a nearby print shop associated with provider 120). System 140 can use the plug-in to retrieve the printer profiles and provider information. Typically, printer 158 of provider 120 can rank low in the printer recommendation list due to the inconvenience of printing outside of enterprise environment 100. However, if print task 132 includes printing 100 photo-quality images on 8-by-10 photo sheets or printing 20 bound copies of a booklet, system 140 may determine that provider 120 can efficiently and cost-effectively complete print task 132. System 140 can then present printer 158 as the recommended printer for print task 132.

System 140 can run on device manager 102, which can operate as a centralized controller that manages a respective printer in enterprise environment 100. Administrator 103 can centrally configure system 140 on device manager 102. In this centrally controlled implementation, driver 142 can learn about the available printers via mechanisms allowed by the enterprise policies. System 140 can obtain the policies in one or more ways. For example, the policies can be set locally when driver 142 is installed, learned as an operating system policy, or set via an external system, such as a cloud system. Administrator 103 can install an agent on device manager 102 that discovers a respective printer in enterprise environment 100 and stores a printer profile of a respective discovered printer in a printer database 108. The printer profile of a printer can include the printer's properties and capabilities (e.g., whether the printer supports double-sided printing or auto-stapling). Hence, individual devices do not need to generate printer profiles.

Figure 1B:
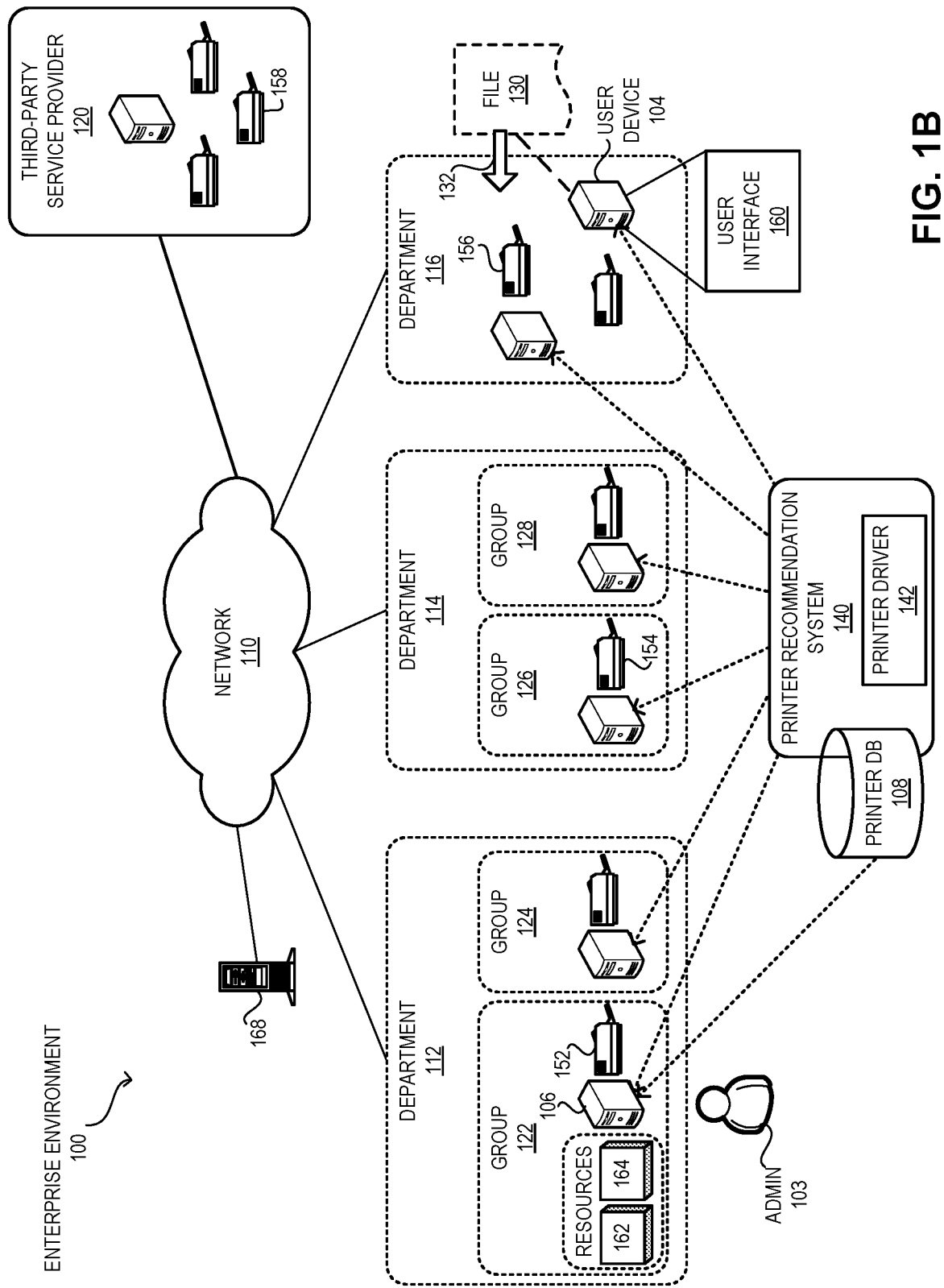
FIG. 1B illustrates an exemplary printer recommendation system with decentralized control in an enterprise environment, in accordance with an embodiment of the present application.

System 140 can also operate without a centralized control. FIG. 1B illustrates an exemplary printer recommendation system with decentralized control in an enterprise environment, in accordance with an embodiment of the present application. In this example, system 140 can be distributed across the user devices in enterprise environment 100. A respective user device can run an instance of system 140. Such a deployment can be suitable for small and medium businesses. System 140 can use decentralized mechanisms to learn the printing environment within enterprise environment 100 and self-configure accordingly. Each device running an instance of system 140 can maintain a copy of printer database 108. Printer database 108 can be hosted on a specific device, such as device 106. The instances of system 140 can then query printer database 108 on device 106.

In this decentralized implementation, printer driver 142 can discover the available printers in enterprise environment 100 using a number of techniques. For example, system 140 can obtain a list of installed printers on the operating system of a respective user device (e.g., devices 104 and 106) and provide the list to driver 142. System 140 can also query network print server 168 to obtain a list of network printers in enterprise environment 100. Furthermore, system 140 can deploy one or more network discovery mechanisms, such as Bonjour® and multicast discovery (e.g., Multicast Listener Discovery). System 140 can also actively scan network 110 (e.g., by sending discovery packets) and determine the presence of a new printer. Administrator 103 can also provide the configuration of a printer to system 140. Among these mechanisms, administrator 103 may select one or more mechanisms for the printer discovery in the decentralized deployment.

Figure 1C:
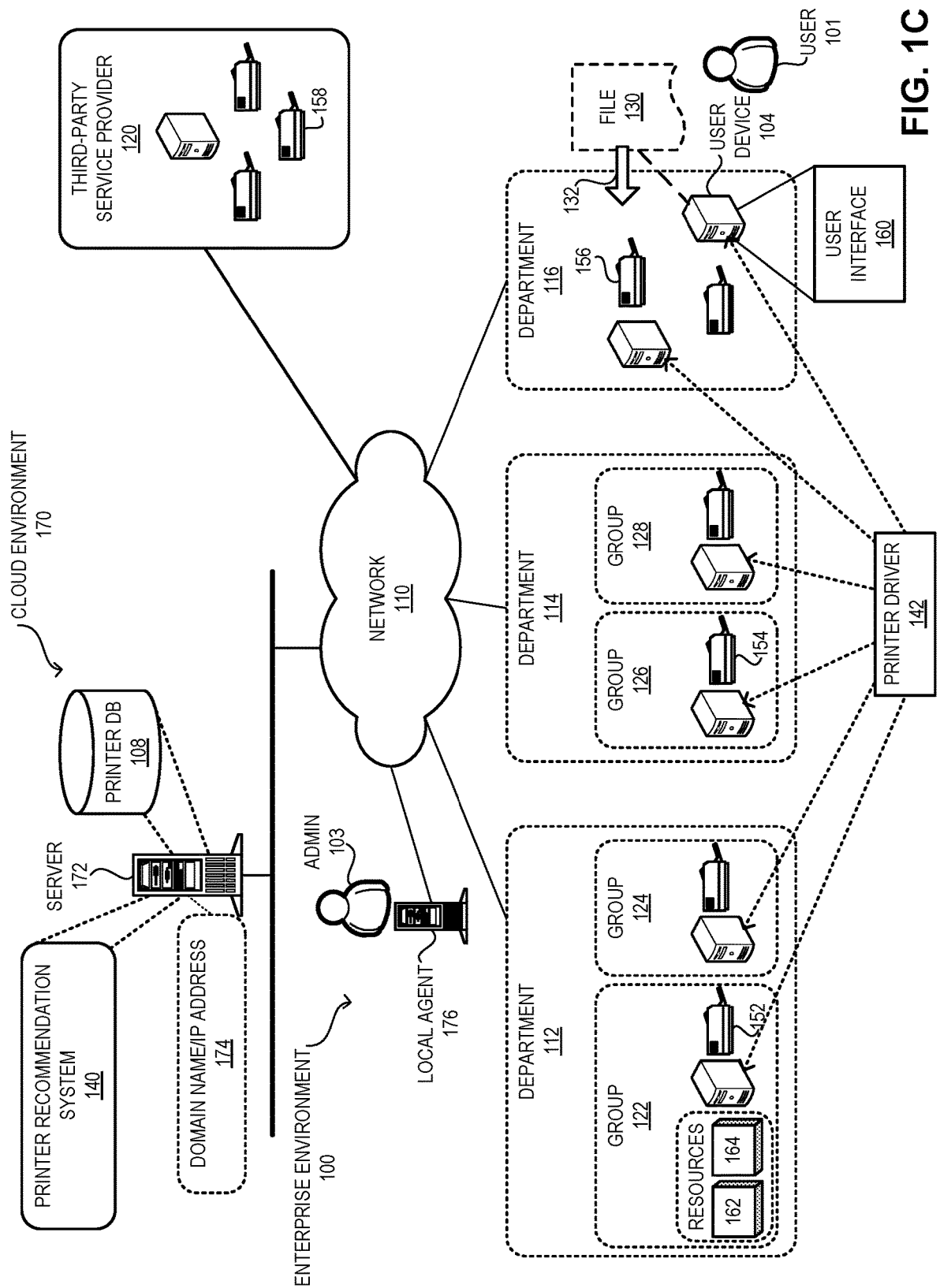
FIG. 1C illustrates an exemplary cloud-based printer recommendation system for an enterprise environment, in accordance with an embodiment of the present application.

System 140 can also be deployed as a cloud-based print service. FIG. 1C illustrates an exemplary cloud-based printer recommendation system for an enterprise environment, in accordance with an embodiment of the present application. The printer driver on a respective device can access the cloud-based service by logging in to the cloud-based system and learns the configurations. System 140 can operate from a cloud environment 170 (e.g., on a cloud server 172). Cloud environment 170 can also host printer database 108. In some embodiments, system 140 can be associated with a domain name and/or IP address 174. System 140 can be accessed from enterprise environment 100 using domain name and/or IP address 174.

A respective user device, such as devices 104 and 106, can run an instance of driver 142. To initiate print task 132, for example, the instance of driver 142 on device 104 can log in to system 140. System 140 can use the login information to automatically configure the operating system of device 104. For example, system 140 can configure the operating system of device 104 with preferences set by administrator 103 or user 101 when the cloud service is enabled on device 104. A local agent 176 can discover the printers in enterprise environment 100. To do so, local agent 176 can deploy the discovery mechanism described in conjunction with FIGS. 1A and 1B. Based on the discovery, local agent 176 can populate printer database 108 hosted in cloud environment 170.

System Architecture

Figure 2:
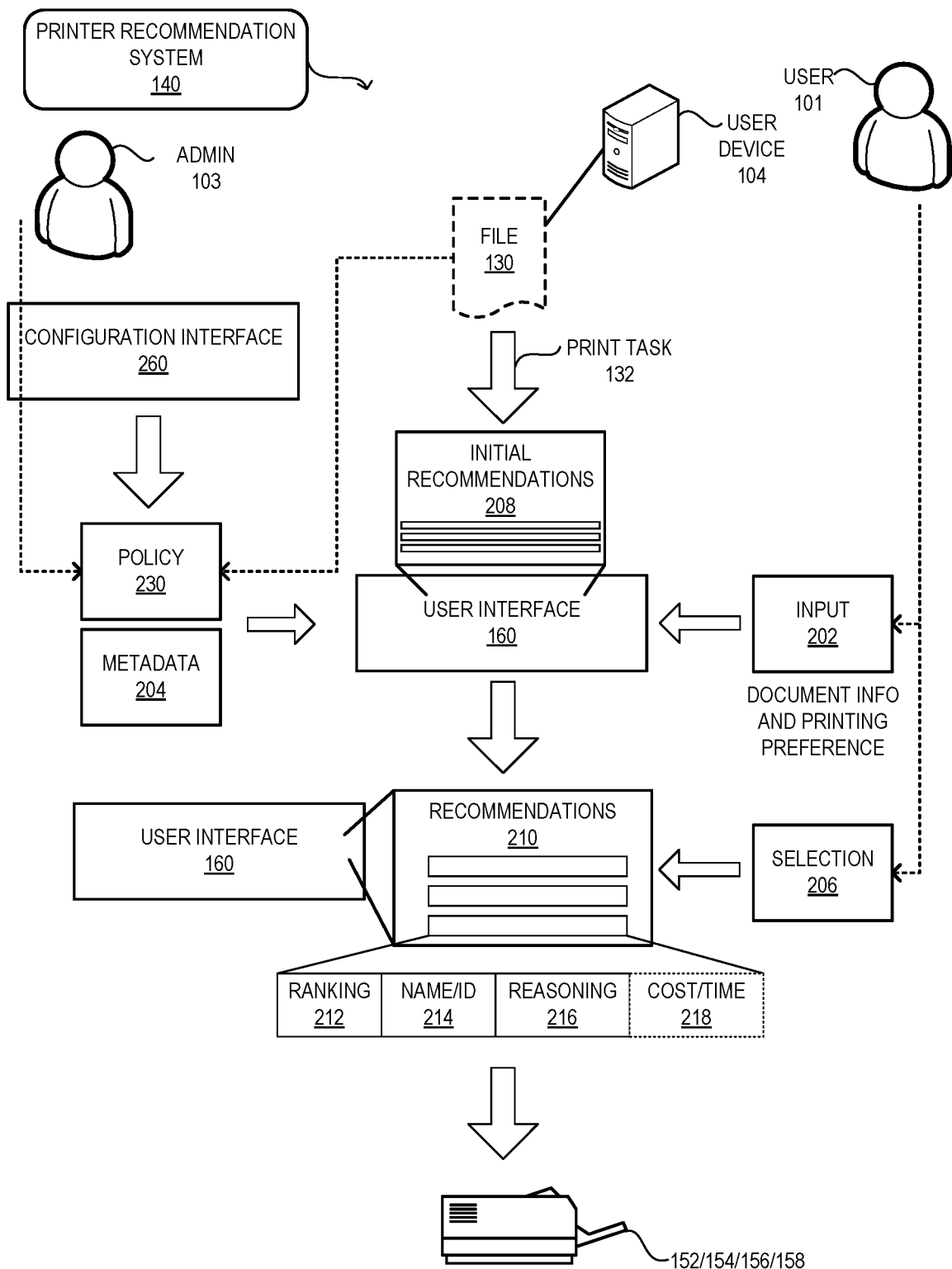
FIG. 2 illustrates an exemplary printer recommendation process, in accordance with an embodiment of the present application.

FIG. 2 illustrates an exemplary printer recommendation process, in accordance with an embodiment of the present application. During operation, when user 101 initiates print task 132 for file 130 (i.e., begins printing file 130), system 140 obtain metadata 204 associated with file 130 (e.g., whether file 130 is a colored document, and/or requires an in-person security clearance for printing) and classifies file 130 using a set of default properties. The default properties can indicate typical printing features, such as monochrome/color printing, page size, finishing options (e.g., double-sided, stapled, etc.), and print quality (e.g., high resolution, economy printing, etc.). In addition, administrator 103 can use a configuration interface 260 provided by system 140 to define a policy 230. Administrator 103 can access interface 260 using administrative credentials. Interface 260 can be based on a GUI, a web interface, a text-based interface, and a projection-based interface (e.g., a hologram interface).

Policy 230 can specify the unit cost of using a printer using a specific set of features. For example, the cost of color printing can be higher than that of monochrome printing. Similarly, the per-page cost of printing single-sided pages can be higher than that of printing double-sided pages. In this way, policy 230 can facilitate configurable printing costs. Furthermore, policy 230 can also define how close a printer is to a user device. In other words, policy 230 can specify proximity information of a printer with respect to one or more user devices. This allows system 140 to recommend features and printers based on proximity in addition to other objectives, such as cost or print speed.

System 140 can then select the most appropriate set of default properties for print task 132 based on metadata 204 and policy 230. System 140 provides the selection as initial printer recommendation 208 in interface 160. Printer recommendation 208 can also indicate whether a printer is unavailable due to a permanent constraint or temporarily unavailable due to a correctable constraint (e.g. a printer is out of legal-size paper but is capable of such printing). User 101 may then provide an input 202 with additional features for print task 132 (e.g., spiral binding, booklet printing, etc.). Input 202 can also specify the document type of file 130 (e.g., an image, a word processing file, etc.) and a printing preference of user 101 (e.g., double-sided printing with stapling). If a newly provided feature in input 202 affects the speed or cost of print task 132, system 140 updates the recommendation accordingly and displays updated printer recommendation 210 in interface 160.

Printer recommendation 208 and/or 210 can show, for a respective recommended printer, a ranking 212, a printer name/identifier 214, a reasoning 216 for selecting the printer, and cost/time 218 needed to complete print task 132 on that printer. Ranking 212 can indicate a ranking of which printer can be most suitable for print task 132. Printer name/identifier 214 can help user 101 to identify a printer. For example, user 101 may recognize that a recommended printer 156 is a nearby printer from printer name/identifier 214. Reasoning 216 can indicate an objective, such as the quickest to complete, cheapest to use, nearest location, most secure to use, etc. Cost/time 218 can indicate how much a print task 132 may cost and how long it may take to complete print task 132 if a particular printer is selected. For example, if printer 158 is selected, it may cost more since it is a printer at a third-party location. Based on these pieces of information, user 101 can then make a final selection 206 from interface 160.

Based on selection 206, system 140 can send print task 132 to the selected printer (e.g., a printer from printers 152, 154, 156, and 158). In this way, regardless of the deployment, system 140 can maintain the information associated with available local, network, and external print services. System 140 can provide user interface 160 that can present such information to user 101. Based on user selection 206 and metadata 204, interface 160 can recommend the best way to print file 130. The "best way" can correspond to one or more objectives, such as print speed, quality, price, or convenience.

Figure 3:
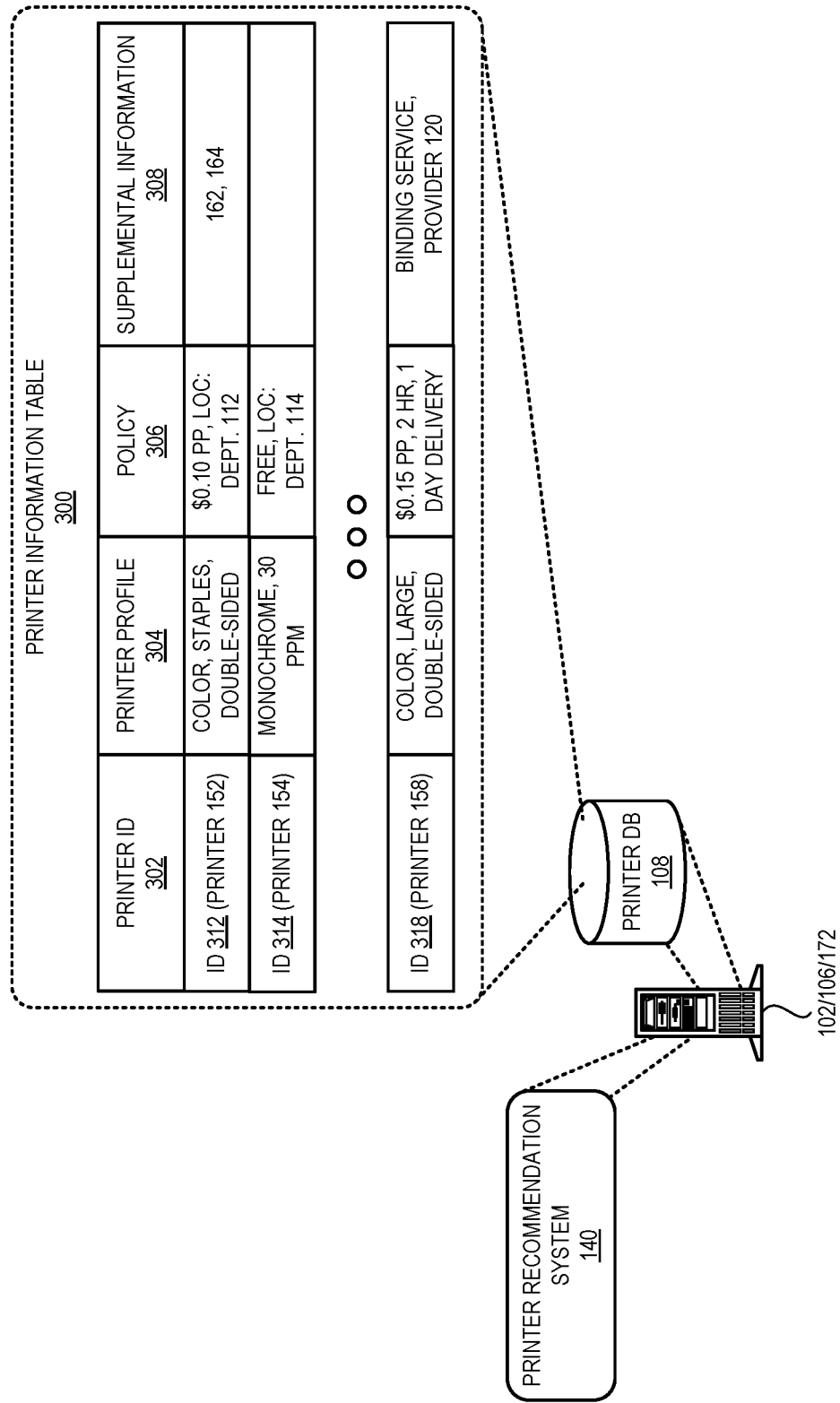
FIG. 3 illustrates an exemplary repository of printer information, in accordance with an embodiment of the present application.

FIG. 3 illustrates an exemplary repository of printer information, in accordance with an embodiment of the present application. Printer database 108 can include a printer information table 300. A respective entry of table 300 can include a printer identifier 302, a printer profile 304, a policy 306, and supplemental information 308. Printer identifier 302 can uniquely identify a printer accessible by a device in enterprise environment 100. For example, printers 152, 154, and 158 can be uniquely identified by identifiers 312, 314, and 318, respectively. Printer profile 304 can include both intrinsic and extrinsic capabilities of a printer. Intrinsic capabilities include features that may be automatically applied to a print task during the print operation, such as duplex, color, paper size, printing speed, etc. Extrinsic capabilities include other services, such as binding, non-standard paper stock, and other features.

Policy 306 can indicate the proximity (e.g., based on printer location) and cost associated with a printer. Supplemental information 308 can include nearby features and resources of a printer. A printer, for example, can be in a room with a spiral binding machine that the user may operate. An entry corresponding to printer 152 can map identifier 312 to its capabilities (e.g., color printing, double-sided printing, stapled finishing), a corresponding policy (e.g., $0.10 per page and the location of printer 152), and resources 162 and 164 available near printer 152. Another entry corresponding to printer 154 can map identifier 314 to its capabilities (e.g., monochrome printing) and policy (e.g., free printing and the location of printer 154). Printer 154 may not have any supplemental information. Similarly, an entry corresponding to printer 158 can map identifier 318 to its capabilities (e.g., color printing, double-sided printing, large pages), a corresponding policy (e.g., $0.15 per page, 2 hour turn-around time, and one day delivery), and additional resources, such as binding service. Supplemental information 308 of printer 158 can also indicate it's a printer of provider 120.

Operations

Figure 4:
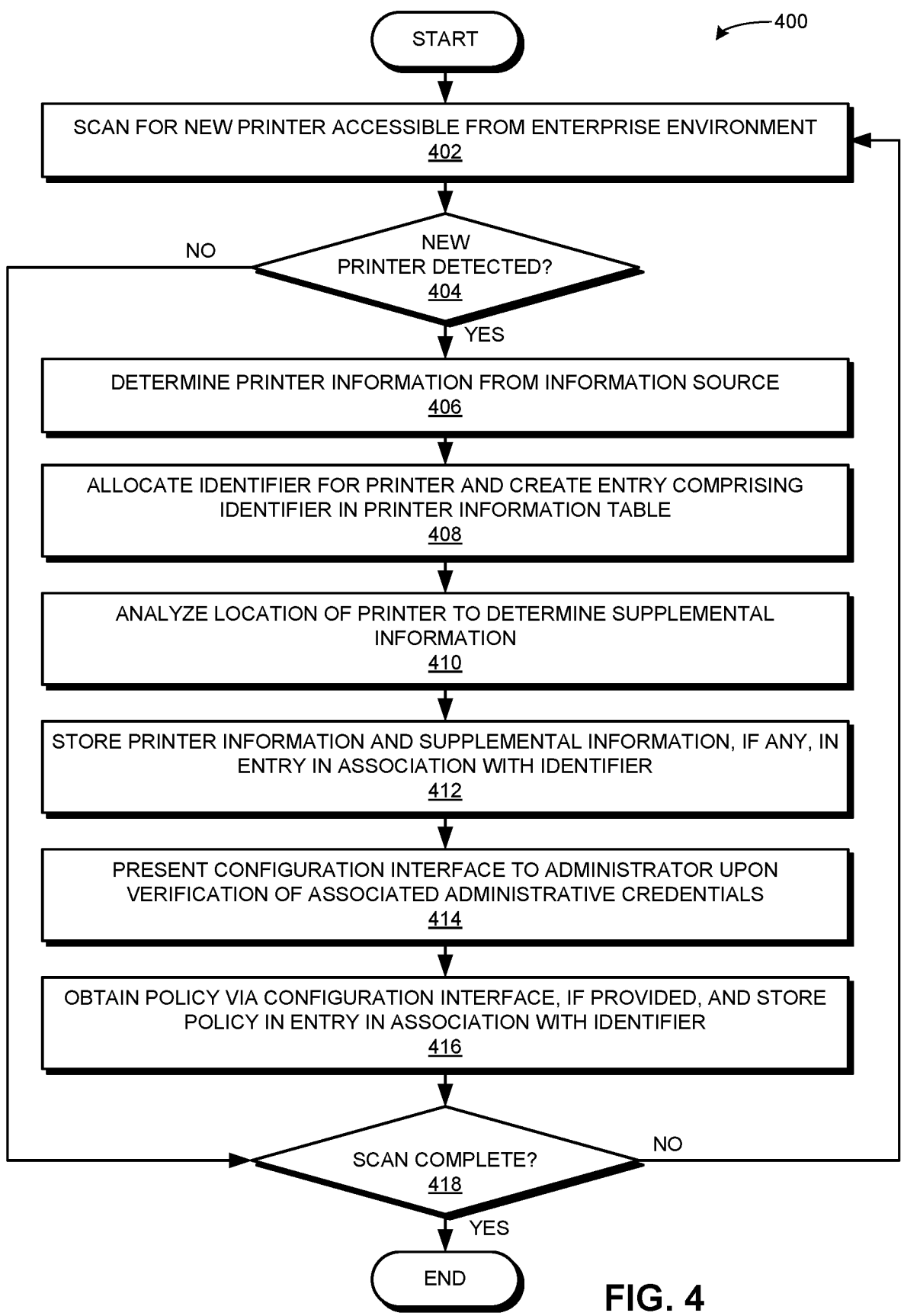
FIG. 4 presents a flowchart illustrating a method of a printer recommendation system discovering printers accessible from an enterprise environment, in accordance with an embodiment of the present application.

FIG. 4 presents a flowchart 400 illustrating a method of a printer recommendation system discovering printers accessible from an enterprise environment, in accordance with an embodiment of the present application. During operation, the system scans for a new printer accessible from the enterprise environment (operation 402). The system can use cloud-based information, a plug-in, or one or more discovery mechanisms to scan for the new printer. These scanning mechanisms can operate as the information source for a new printer. The system checks whether a new printer is detected (operation 404). If a new printer is detected, the system determines printer information (e.g., intrinsic and extrinsic capabilities of the printer) from the information source (operation 406). The system can then allocate an identifier for the printer and create an entry comprising the identifier in the printer information table (operation 408).

The system analyzes the location of the printer to determine supplemental information (operation 410). For example, if the printer is in a room with a spiral binding machine, which is relevant to print tasks, the system can indicate the presence of the spiral binding machine in the supplemental information. Similarly, if the printer is a third-party service provider printer, the system can indicate the other print-related services supported by the provider. The system then stores the printer information and supplemental information, if any, in the entry in association with the identifier (operation 412). The system can present a configuration interface to an administrator upon verification of associated administrative credentials (operation 414).

The system can obtain a policy via the configuration interface, if provided, and store the policy in the entry in association with the identifier (operation 416). On the other hand, if a new printer is not detected (operation 404) or upon storing the policy in the entry (operation 416), the system checks whether the scan operation is complete (operation 418). The system can determine that the scan operation is complete based on one or more of: expiration of a timer, completion of searching in a respective subnet in the enterprise environment, and completion of the discovery operations (e.g., searching within and outside of the enterprise environment). If the scan is not complete, the system can continue to scan for a new printer accessible from the enterprise environment (operation 402).

Figure 5A:
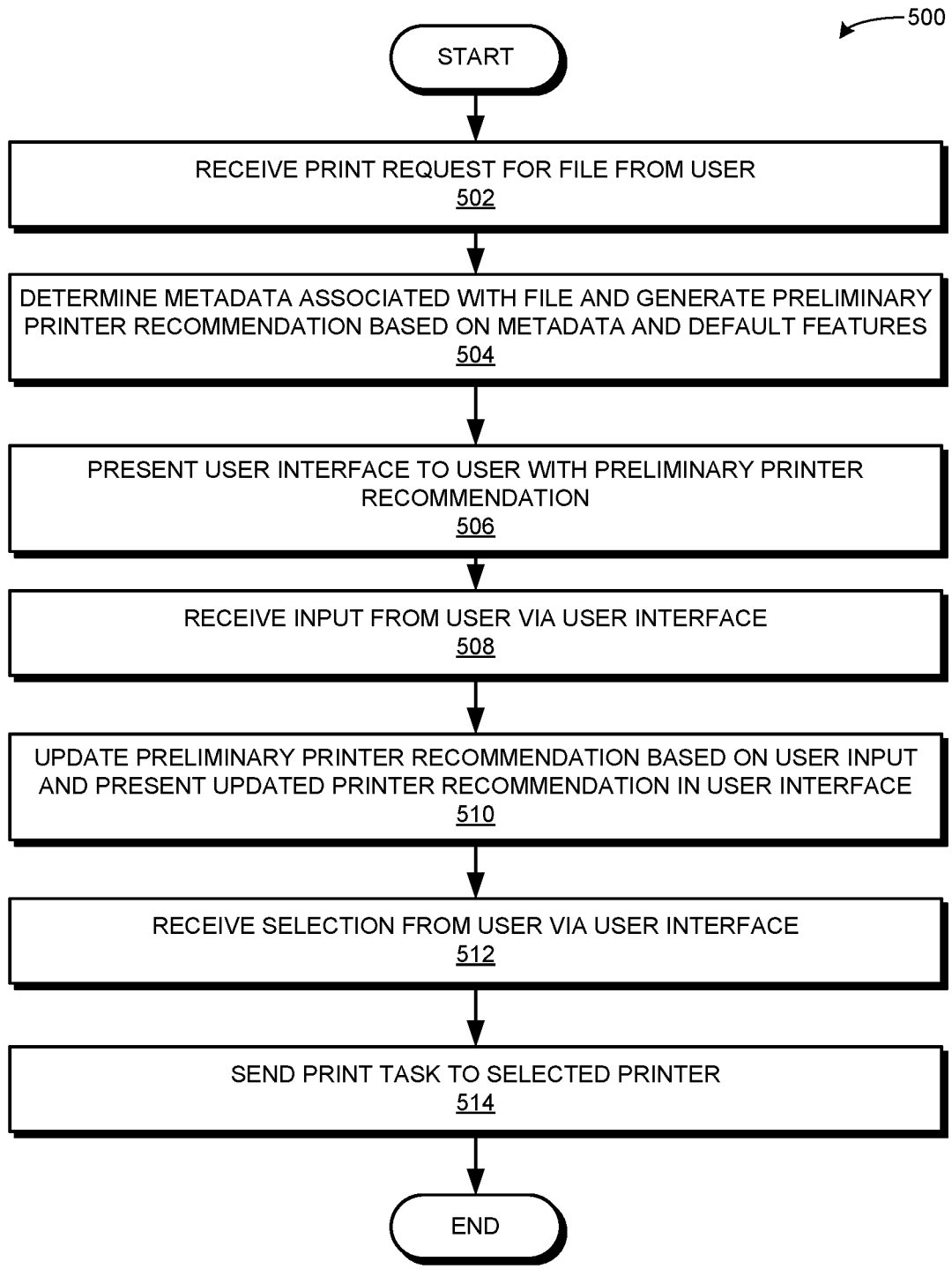
FIG. 5A presents a flowchart illustrating a method of a printer recommendation system processing a print task based on a printer recommendation, in accordance with an embodiment of the present application.

FIG. 5A presents a flowchart 500 illustrating a method of a printer recommendation system processing a print task based on a printer recommendation, in accordance with an embodiment of the present application. During operation, the system receives a print request for a file from a user (operation 502), and determines metadata associated with the file and generates a preliminary printer recommendation based on the metadata and the default features (operation 504). The system can present a user interface to the user with the preliminary printer recommendation (operation 506). The system then receives input from the user via the user interface (operation 508). The user input can include additional features of the file and printing preferences of the user.

The system updates the preliminary printer recommendation based on the user input and presents the updated printer recommendation in the user interface (operation 510). The system then receives a selection from the user via the user interface (operation 512). It should be noted that the user may select a printer ranked low in the printer recommendation. The system then sends the print task to the selected printer (operation 514).

Figure 5B:
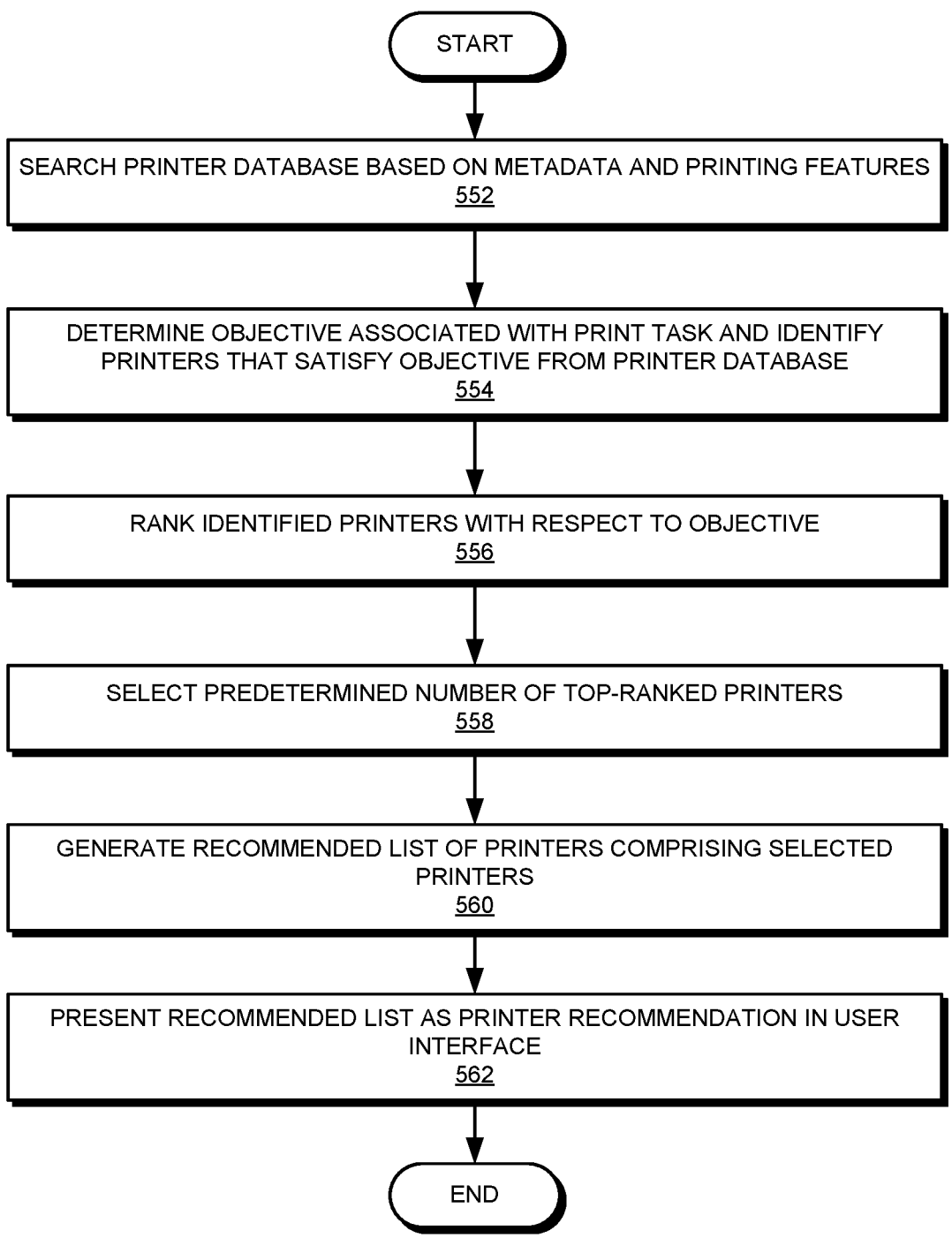
FIG. 5B presents a flowchart illustrating a method of a printer recommendation system generating a printer recommendation for processing a print task, in accordance with an embodiment of the present application.

FIG. 5B presents a flowchart 550 illustrating a method of a printer recommendation system generating a printer recommendation for processing a print task, in accordance with an embodiment of the present application. During operation, the system searches the printer database based on the metadata and the printing features (operation 552). If the recommendation is a preliminary recommendation, the features can be default features of the printers, and if the recommendation is an updated recommendation, the features can include input from the user. The system then determines an objective associated with the print task and identifies the printers that satisfy the objective from the printer database (operation 554). The system can determine the objective based on a default preference of the user or an enterprise policy.

The system then ranks the identified printers with respect to the objective (operation 556). For example, if the objective is the fastest printing, the ranking can list the printers in ascending order of the estimated time to finish the print task (e.g., the fastest printer at the top of the list). The system then selects a predetermined number of top-ranked printers (operation 558). The predetermined number can be specific to a user, a type of print task, or the enterprise, and configured by an administrator. The system then generates a recommended list of printers comprising the selected printers (operation 560). For a respective printer, the list can specify a rank, a name/identifier of the printer, the reasoning for recommending the printer, and cost/time information for the print task. The system then presents the recommended list as the printer recommendation in the user interface (operation 562).

Figure 6:
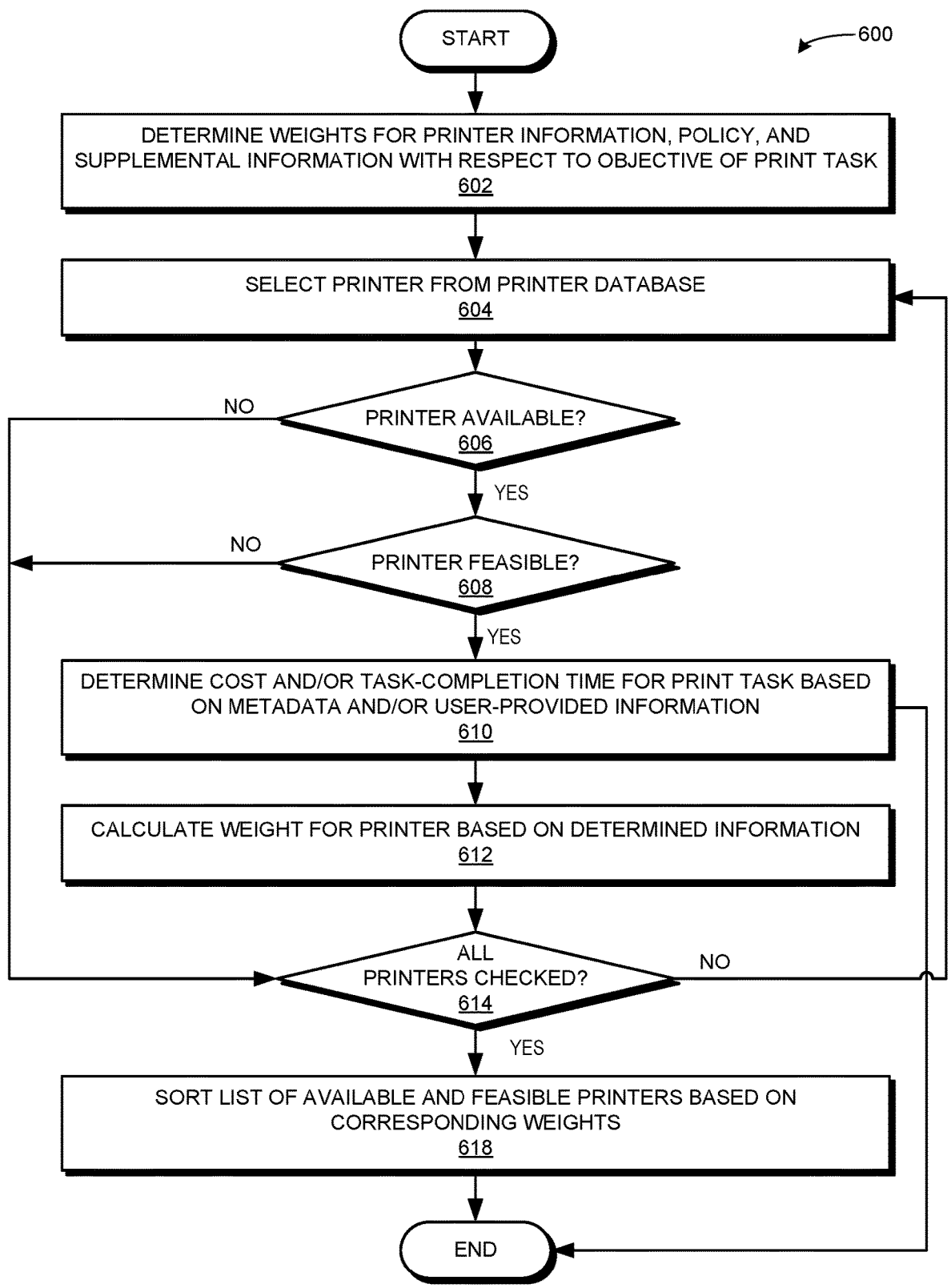
FIG. 6 presents a flowchart illustrating a method of a printer recommendation system ranking the printers for a print task, in accordance with an embodiment of the present application.

FIG. 6 presents a flowchart 600 illustrating a method of a printer recommendation system ranking the printers for a print task, in accordance with an embodiment of the present application. During operation, the system determines weights for printer information, policy, and supplemental information with respect to the objective of the print task (operation 602). The system selects a printer from the printer database (operation 604) and determines whether the printer is available (operation 606). The printer can be unavailable due to a permanent issue (e.g., a mechanical or electrical fault in the printer) or a temporary issue (e.g., the printer is out of paper). If the printer is available, the system also checks whether the printer is feasible (operation 608). A printer can be infeasible if the printer does not support the type of features needed for the print task (e.g., a printer may not support color printing).

If the printer is available and feasible, the system determines the cost and/or the task-completion time for the print task based on the metadata and/or user-provided information (operation 610) and calculates a weight for the printer based on the determined information (operation 612). The metadata can include information about the file, such as the type of the file (e.g., color or monochrome), the number of pages in the file, and the type of content in the file (e.g., image or text). If the printer is not available or feasible (operation 606 or 608), or upon calculating the weight of the printer (operation 612), the system determines whether all printers have been checked (operation 614). If all printers have not been checked, the system continues to select the next printer from the printer database (operation 604). Otherwise, the system sorts the list of available and feasible printers based on the corresponding weights (operation 618).

Exemplary Computer System and Apparatus

Figure 7:
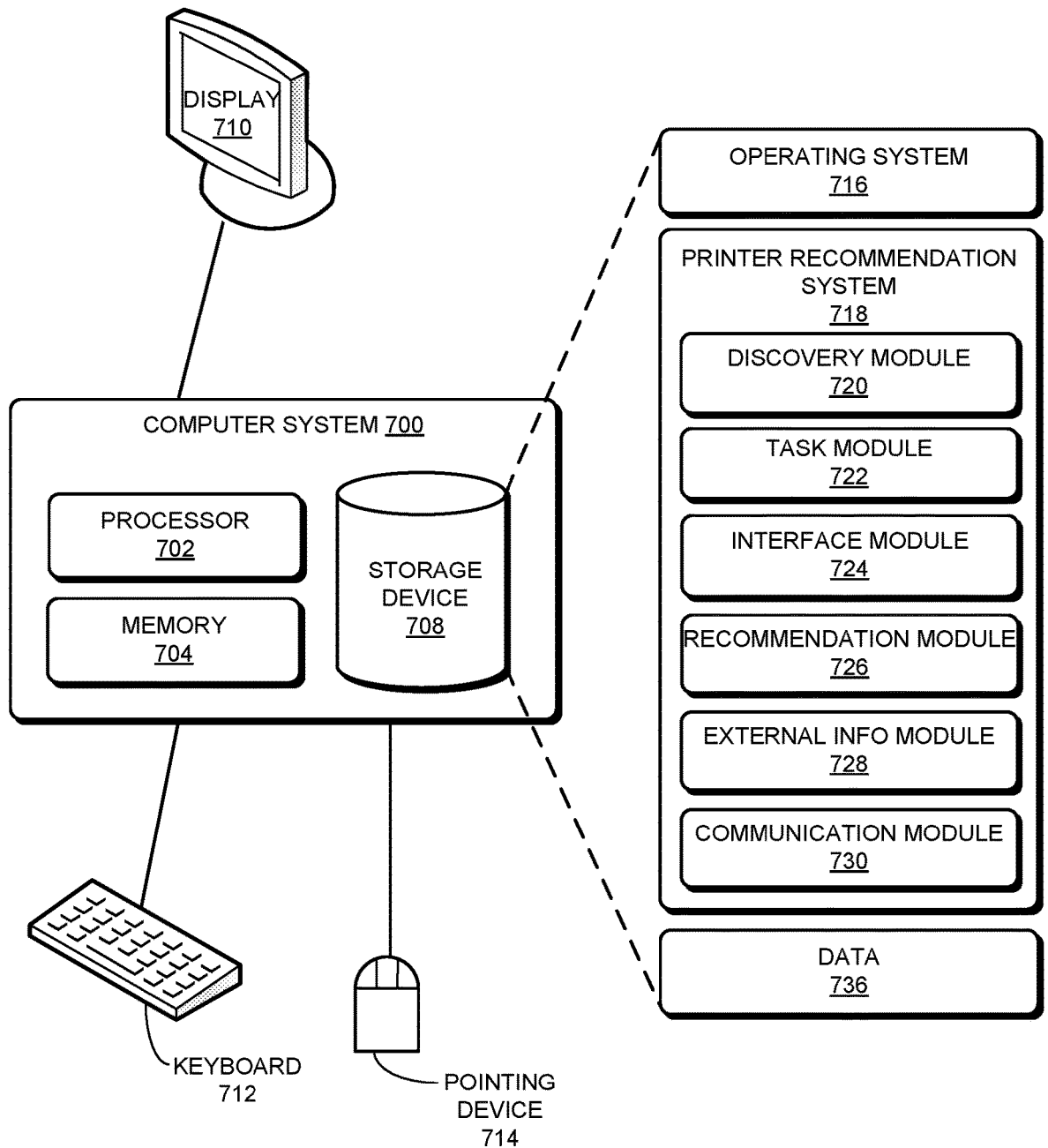
FIG. 7 illustrates an exemplary computer system that facilitates a printer recommendation system for an enterprise environment, in accordance with an embodiment of the present application.

FIG. 7 illustrates an exemplary computer system that facilitates a printer recommendation system for an enterprise environment, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a printer recommendation system 718, and data 736. Printer recommendation system 718 can be implemented using centralized, decentralized, and/or cloud-based deployments.

Printer recommendation system 718 can include instructions, which when executed by computer system 700 can cause computer system 700 to perform methods and/or processes described in this disclosure. Specifically, printer recommendation system 718 can include instructions for discovering a respective printer accessible from the enterprise environment (discovery module 720). Printer recommendation system 718 can also include instructions for determining metadata of a file associated with a print task (task module 722). Furthermore, printer recommendation system 718 can also include instructions for determining print features associated with the print task (task module 722). In addition, printer recommendation system 718 can include instructions for executing the print task on a selected module (task module 722).

Moreover, printer recommendation system 718 can also include instructions for presenting a user interface and a configuration interface (interface module 724). Printer recommendation system 718 can include instructions for determining a printer recommendation associated with the print task (recommendation module 726). Printer recommendation system 718 can further include instructions for obtaining user input and selection for the print task (recommendation module 726). Printer recommendation system 718 can also include instructions for obtaining cloud-based and/or third-party service provider information based on cloud sources and/or plug-ins (external information module 728). Printer recommendation system 718 may further include instructions for sending and receiving messages (communication module 730). Data 736 can include any data that can facilitate the operations of printer recommendation system 718.

Figure 8:
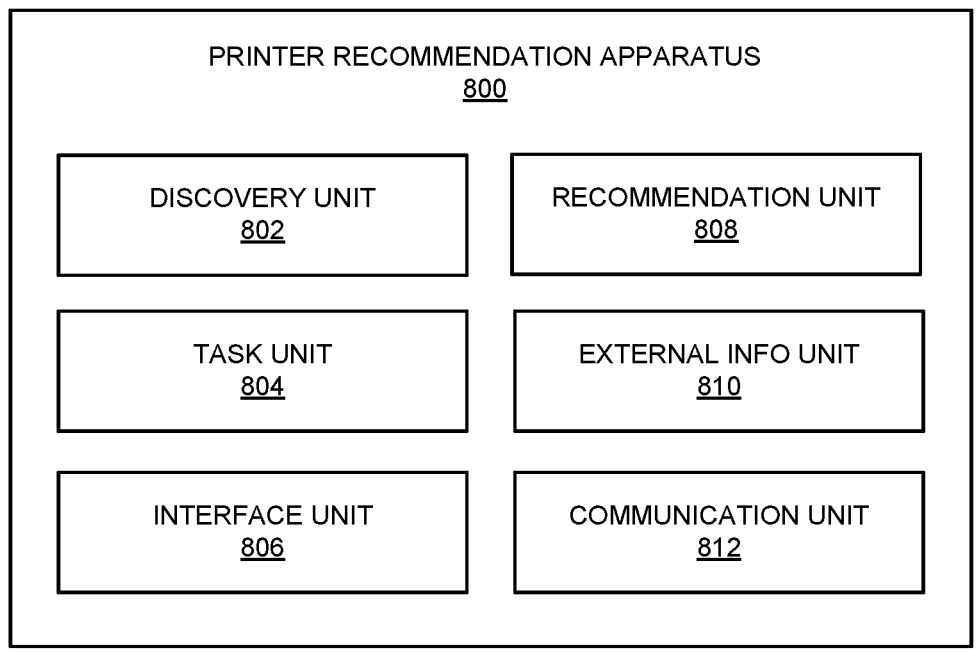
FIG. 8 illustrates an exemplary apparatus that facilitates a printer recommendation system for an enterprise environment, in accordance with an embodiment of the present application.

FIG. 8 illustrates an exemplary apparatus that facilitates a printer recommendation system for an enterprise environment, in accordance with an embodiment of the present application. Printer recommendation apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-812, which perform functions or operations similar to modules 720-730 of computer system 700 of FIG. 7, including: a discovery unit 802; a task unit 804; an interface unit 806; a recommendation unit 808; an external information unit 810; and a communication unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating a printer recommendation in an enterprise environment, comprising:
   discovering information associated with a respective printer accessible from the enterprise environment;
   in response to the discovery of the printer, obtaining, via a user interface, a policy dictating printing operations associated with the printer;
   storing the discovered information and the policy associated with the discovered printer in a printer database in association with an identifier of the discovered printer;
   receiving, from a user device in the enterprise environment, a print task for a file;
   determining, based on information associated with the print task, metadata associated with the file, and an objective and a set of features of the print task;
   determining, from the printer database, a list of printers based on the metadata associated with the file, the features of the file, and the policy associated with a respective printer in the list of printers, wherein a respective printer in the list of printers is available and feasible for the print task;
   ranking the list of printers with respect to an objective of the print task; and
   presenting the ranked list as a printer recommendation for the print task in the user interface to the user.

2. The method of claim 1, further comprising:
   obtaining a user input from the user interface; and
   in response to detecting a change to the printer recommendation in the user input:
      updating the ranked list based on the user input to determine a second ranked list; and
      presenting the second ranked list as the printer recommendation in the user interface.

3. The method of claim 1, further comprising:
   receiving a selection of a target printer from the printer recommendation via the user interface; and
   sending the print task to the target printer.

4. The method of claim 1, wherein the discovery operation comprises discovering a printer accessible from the enterprise environment based on a discovery mechanism, which is one or more of: a centralized mechanism, a decentralized mechanism, and a cloud-based mechanism.

5. The method of claim 4, wherein the discovery operation further comprises, in response to discovering a printer, storing a printer profile for the discovered printer in the printer database, wherein the printer profile includes the identifier of the discovered printer and one or more of: a printer name, a printer location, intrinsic capabilities of the discovered printer, extrinsic capabilities of the discovered printer, and cost information.

6. The method of claim 5, further comprising:
   discovering print-related resources within a predetermined proximity of the discovered printer; and
   storing information associated with the print-related resources in the printer profile.

7. The method of claim 5, further comprising:
   in response to obtaining the policy for the discovered printer, storing the policy in the printer profile.

8. The method of claim 1, further comprising:
   identifying an external print service provider based on cloud-based information or a plug-in, wherein the external print service operates outside of the enterprise environment and is accessible from the enterprise environment;
   obtaining an external printer profile of a printer of the external service provider from the cloud-based information or the plug-in, wherein the list of printers accessible from the enterprise environment includes the printer of the external service provider; and
   storing the external printer profile in the printer database.

9. The method of claim 1, wherein the objective is one or more of: quickest to complete, cheapest to use, nearest location, and most secure.

10. The method of claim 1, further comprising determining whether a respective printer in the list of printers is available and feasible based on permanent issues and temporary issues associated with the printer.

11. A non-transitory computer-readable storage medium storing instructions that when executed by a computer cause the computer to perform a method for facilitating a printer recommendation in an enterprise environment, the method comprising:
   discovering information associated with a respective printer accessible from the enterprise environment;
   in response to the discovery of the printer, obtaining, via a user interface, a policy dictating printing operations associated with the printer;
   storing the discovered information and the policy associated with the discovered printer in a printer database in association with an identifier of the discovered printer;
   receiving, from a user device in the enterprise environment, a print task for a file;
   determining, based on information associated with the print task, metadata associated with the file, and an objective and a set of features of the print task;
   determining, from the printer database, a list of printers based on the metadata associated with the file, the features of the file, and a corresponding policy allocated for a respective printer, wherein a respective printer in the list of printers is available and feasible for the print task;

ranking the list of printers with respect to an objective of the print task; and presenting the ranked list as a printer recommendation for the print task in the user interface to the user.

12. The computer-readable storage medium of claim 11, wherein the method further comprises:

obtaining a user input from the user interface; and in response to detecting a change to the printer recommendation in the user input:

updating the ranked list based on the user input to determine a second ranked list; and presenting the second ranked list as the printer recommendation in the user interface.

13. The computer-readable storage medium of claim 11, wherein the method further comprises:

receiving a selection of a target printer from the printer recommendation via the user interface; and sending the print task to the target printer.

14. The computer-readable storage medium of claim 11, wherein the discovery operation comprises discovering a printer accessible from the enterprise environment based on a discovery mechanism.

15. The computer-readable storage medium of claim 14, wherein the discovery operation further comprises, in response to discovering a printer, storing a printer profile for the discovered printer in the printer database, wherein the printer profile includes the identifier of the discovered printer and one or more of: a printer name, a printer location, intrinsic capabilities of the discovered printer, extrinsic capabilities of the discovered printer, and cost information.

16. The computer-readable storage medium of claim 15, wherein the method further comprises:

discovering print-related resources within a predetermined proximity of the discovered printer; and storing information associated with the print-related resources in the printer profile.

17. The computer-readable storage medium of claim 15, wherein the method further comprises:

in response to obtaining the policy for the discovered printer, storing the policy in the printer profile.

18. The computer-readable storage medium of claim 11, wherein the method further comprises:

identifying an external print service provider based on cloud-based information or a plug-in, wherein the external print service operates outside of the enterprise environment and is accessible from the enterprise environment;

obtaining an external printer profile of a printer of the external service provider from the cloud-based information or the plug-in wherein the list of printers accessible from the enterprise environment includes the printer of the external service provider; and storing the external printer profile in the printer database.

19. The computer-readable storage medium of claim 11, wherein the objective is one or more of: quickest to complete, cheapest to use, nearest location, and most secure.

20. The computer-readable storage medium of claim 11, wherein the method further comprises determining whether a respective printer in the list of printers is available and feasible based on permanent issues and temporary issues associated with the printer.

* * * * *